United States Patent Office 3,654,082
Patented Apr. 4, 1972

3,654,082
PRODUCTION OF HIGH MALTOTETRAOSE SYRUP
Mukhtar Abdullah, Westmont, Ill., assignor to
CPC International Inc.
No Drawing. Filed Feb. 10, 1969, Ser. No. 798,151
Int. Cl. C12b 1/00
U.S. Cl. 195—31 R     31 Claims

ABSTRACT OF THE DISCLOSURE

A process is described for converting starch which comprises subjecting a solution of a gelatinized starch selected from the group consisting of acid-modified starch, partial hydrolyzates of starch obtained by acid and/or enzyme hydrolysis of starch, and mixtures thereof, to the action of an amylase which is produced by the microorganism *Pseudomonas stutzeri* and recovering a starch conversion product. The prior or simultaneous use of a starch debranching enzyme during the conversion process is also disclosed. A novel maltotetraose syrup and dried solids obtainable from said syrup are additionally revealed.

---

This invention relates to a novel starch conversion product and a method of producing said starch conversion product. The product is a high maltotetraose hydrolyzate or syrup. Dried solids obtainable from said hydrolyzate or syrup are also revealed.

The amount of corn syrup manufactured annually in the United States is in excess of two billion pounds. Its primary use is in the food processing industry and the major application is in the confectionery field. Nearly all major countries of the world manufacture or import starch syrups.

The properties desired in a finished candy generally determine the specific type of syrup to be used in formulating the candy. Hard candies, which are essentially solid solutions of carbohydrates, contain corn syrup which contributes resistance to heat discoloration, prevention of sugar crystallization, and lack of stickiness. High maltose syrups have been found to provide less hygroscopicity and better color stability than regular acid hydrolyzed corn syrups.

Corn syrup is also substantially used in the ice cream and frozen dessert industry. In these applications, dextrose and corn syrups are added in combination with cane or beet sugar as supplemental sweeteners. The primary purpose of the corn syrup is to provide maximum flexibility in adjusting flavor, texture, smoothness and body. The use of high maltose syrups generally permits the use of a higher corn syrup-to-sucrose ratio than do other types of corn syrup. Hight maltose syrups are also useful in controlling crystal formation in frozen dessert formulations.

The syrup product of the present invention is a high maltotetraose syrup. That is, it is a syrup containing a large percentage of maltotetraose which is a tetramer of glucose comprised of four glucose residues connected through alpha-1, 4-glucosidic linkages. The syrup may be spray dried by conventional techniques to form a high maltotetraose syrup solid.

The use of high maltotetraose syrup in hard candy formulation is especially promising due to its low hygroscopicity. The use of high maltotetraose syrup in ice creams should permit the use of quite high corn syrup-to-sucrose ratios.

The use of acid-modified starch or partial hydrolyzates of starch obtained by acid and/or enzyme hydrolysis of starch in the present process makes possible the treatment of high dry substance concentrations of starch, whereas, only low dry substance concentrations of unmodified starch, up to about 5% by weight, can be treated, due to retrogradation problems. Thus, to achieve large quantities of maltotetraose syrup from unmodified starch it is necessary to handle large quantities of liquids with concurrent large costs in bringing these large volumes of liquids to temperature and with the expensive necessity of removing a large quantity of water to attain syrups of a truly high maltotetraose content.

In view of the above, it is a principal object of this invention to provide an improved method for the production of a starch conversion product high in maltotetraose content.

A further object is to provide an improved method for the production of high maltotetraose syrup in high yield from acid-modified starch and from partial hydrolyzates of starch obtained by acid and/or enzyme hydrolysis of starch.

Still another object of the invention is to provide a process for converting acid-modified starch and partial hydrolyzates of starch obtained by acid and/or enzyme hydrolysis of starch to maltotetraose syrup with a maltotetraose content higher than those produced heretofore without the costly necessity of removing large quantities of water.

Yet another object of the invention is to provide such a maltotetraose syrup for use in confectionery applications and for the formulation of ice creams and frozen desserts.

Other objects of the invention will be self-evident or will appear hereinafter.

My method of high maltotetraose syrup production consists, generally, of incubating a water solution of an acid-modified starch, a partial hydrolyzate of starch obtained by acid and/or enzyme hydrolysis of starch, or mixtures thereof with an amylase of the type produced by the bacterium *Pseudomonas stutzeri*.

An improved yield of maltotetraose is obtained if a starch debranching enzyme is also used in the incubation process either prior to or simultaneously with the *Pseudomonas stutzeri*.

The acid-modified starch and the partial hydrolyzate of starch obtained by acid and/or enzyme hydrolysis of starch, used as starting materials in the present invention may be obtained by acid-modifying or acid and/or enzyme-hydrolyzing any conventional starch. Suitable starches include cereal starches such as corn, grain, sorghum, and wheat; waxy starches such as waxy milo and waxy maize; and root starches such as potato starch and tapioca starch. Crude starch sources may also be used such as ground cereals, macherated tubers, or the partially purified starches therefrom. Preferred starches include acid-modified waxy milo starch, partially enzyme hydrolyzed waxy milo starch, partially acid hydrolyzed corn starch, and partially enzyme hydrolyzed corn starch.

Before the starch can be converted to a high maltotetraose syrup, it must first be solubilized in water, preferably to form a solution containing over 5% by weight of starch. Preferably, the water solution should contain from about 10% to about 55% by weight of starch. This solution may be formulated by any of the methods common in the starch art.

In the case of an acid-modified starch, the starch solution is prepared by first modifying the starch by conventional methods, such as are disclosed in detail, for example, in volume 2, Chapters 9, 10 and 11 of Starch: Chemistry and Technology, R. L. Whistler and E. F. Paschall, Editors, Academic Press, Inc., New York and London (1967).

The acid-modified starch is then solubilized by suspending it in water and heating the solution to above the solubilization temperature of the starch. Alternatively, a commercially available acid-modified starch may be solubilized in the same manner.

A partial acid hydrolyzate of starch may be prepared by acid hydrolysis comprising heating a water slurry of the parent starch above the gelatinization temperature of the starch in the presence of acid. Alternatively, a solution of a partial acid hydrolyzate of starch may be prepared by solubilizing in water a commercially available syrup solid made from a partial acid hydrolyzate of starch.

A partial enzyme hydrolyzate of starch, commonly known as an enzyme-thinned starch, may be formulated by making a solution of a non-thinned starch in water by heating a slurry of the non-thinned starch above the solubilization temperature of the starch and then incubating the starch solution by conventional procedures with an alpha-amylase such as bacterial alpha-amylase. A solution of an enzyme-thinned starch may alternatively be made by solubilizing a syrup made from an enzyme-thinned starch by the same method used for making a solution of an acid-modified starch or by other means known in the starch art. A solution of a mixture of the above starches may be formulated in the same manner.

By conventional procedures, starches for use in this invention are generally partially hydrolyzed by acid or enzyme hydrolysis to a D.E. value below about 25. Preferably, the D.E. falls within the range of from about 5 to about 16. D.E. is the abbreviation for dextrose equivalent which represents the conventional measure of the total reducing sugar content of a starch hydrolyzate, calculated as dextrose and expressed as percent by weight of the dry substance present. Thinning to these extents enables the starches to be handled as solutions as the preferred solids levels of from about 10% to about 55% by weight without introducing the problem of extensive retrogradation.

The acid-modified starch, partial acid and/or enzyme hydrolyzate of starch, or mixture thereof, is then converted to a high maltotetraose hydrolyzate at a temperature falling within the range from about 40° C. to about 65° C. and at a pH value falling within the range from about 6 to about 9. It is preferred that the incubation be carried out at a temperature falling within the range from about 50° C. to about 60° C. and at a pH falling within the range about 6.5 to about 7.5. A starch conversion product produced in this manner will have a maltotetraose content of the solids therein of at least 20% by weight and will have a D.E. of at least 13.

The high maltotetraose hydrolyzate may then be converted to a high maltotetraose syrup by removal of water by evaporation or other equivalent means. Since the maltotetraose concentration in the hydrolyzate is higher than that attainable from unmodified starch considerably less water need be removed to arrive at a high maltotetraose syrup product.

It is preferred that the enzyme which is utilized to form the high maltotetraose syrup be the amylase produced by the microorganism *Pseudomonas stutzeri*. Most preferably the enzyme is produced by *Pseudomonas stutzeri* strain NRRL B3389 obtainable from the Northern Regional Research Laboratory of the United States Department of Agriculture, located at Peoria, Ill.

Improved yields of maltotetraose may be obtained if the starch is also incubated with a starch debranching enzyme. This can be done either prior to or simultaneously with the incubation with the amylase of the type produced by *Pseudomonas stutzeri*. Preferably, the starch conversion is simultaneously carried out in the presence of the starch debranching enzyme and the *Pseudomonas stutzeri* type amylase. Pullulanase is the preferred starch debranching enzyme. The preferred temperature, pH and concentration ranges are about the same as when a starch debranching enzyme is not used.

According to my experience as little as 100 units (as later defined) of *Pseudomonas stutzeri* amylase per 100 grams of starch is sufficient to produce a maximum maltotetraose yield within 2 days. Larger quantities of the enzyme may, of course, be used but this will only result in additional cost. Smaller quantities of the enzyme may also be used but this may result in longer incubation times.

PREPARATION OF ENZYMES

*Pseudomonas stutzeri* amylase

*Pseudomonas stutzeri* amylase is produced from the microorganism *Pseudomonas stutzeri* and may be prepared as follows. A culture of *Pseudomonas stutzeri* strain NRRL B3389, was obtained from the Northern Regional Research Laboratory of the U.S. Department of Agriculture in Peoria, Ill. The organism was maintained on slants of Brain-Heart-Infusion (BHI-Agar) containing 0.2% soluble starch. The BHI-Agar was obtained from Difco Laboratories, Detroit, Mich.

For production of *Pseudomonas stutzeri* amylase, cells from a stock slant were aseptically transferred to 500 milliliter Erlenmeyer flasks containing 100 milliliters each of a seed medium composed of 1% Tryptone (obtained from Difco Laboratories, Detroit, Mich.), 0.5% yeast extract, 0.28% $K_2HPO_4$, 0.1% $KH_2PO_4$, 0.2% soluble starch and the remainder water. These flasks were incubated at 30° C. for 18 hours on a reciprocal shaker.

Ten milliliter portions of seed medium were used to inoculate 1,000 milliliter Erlenmeyer flasks containing 200 milliliters of a production medium composed of 1% Tryptone, 0.5% yeast extract, 0.28% $K_2HPO_4$, 0.1% $KH_2PO_4$, 1% soluble starch, and the remainder water. The fermentation flasks were incubated for about 24 hours at 30° C. on a rotary shaker operated at 220 r.p.m. After fermentation, the culture broth, which possessed an activity of 1–5 units per milliliter, was harvested by centrifugation. The centrifugate was then used as the source of *Pseudomonas stutzeri* amylase.

To further concentrate the *Pseudomonas stutzeri* amylase, the culture centrifugate was mixed with a volume of 2-propanol equal to twice the volume of the centrifugate and which contained suspended therein 10 grams of diatomaceous earth per liter of 2-propanol. The enzyme was insoluble in the resulting solution. It was physically adsorbed onto the diatomaceous earth. The enzyme-diatomaceous earth precipitate was collected by filtration and dried to give a dried enzyme product which was 5 to 20 times more active per unit weight than was the original culture broth.

*Pseudomonas stutzeri* amylase activity was determined as follows: (1) a solution of 0.55 weight percent soluble starch (Merck, reagent grade) was dissolved in a 0.02 molar glycerophosphatehydrogen chloride buffer (pH 6.9) which contained 0.02 molar calcium chloride; (2) reagents were prepared for the determination of reducing sugars as described by N. Nelson, J. Biol. Chem. 153, 375.; (1944); (3) 9 milliliters of starch solution was pipetted into a test tube, and the tube was placed in a 25° C. water bath for 15 minutes to equilibrate to temperature; (4) 1 milliliter of the *Pseudomonas stutzeri* amylase solution to be assayed, was added to the test tube; (5) the resultant 10 milliliter solution was mixed and incubated at 25° C. for 10 minutes; (6) a 2 milliliter sample of the solution was withdrawn and the amount of reducing sugars produced was determined by the above-referenced method of Nelson.

One unit of enzyme activity is defined as being equal to one micromole of reducing sugar produced, calculated as dextrose, per milliliter of enzyme solution per minute.

PULLULANASE

The debranching enzyme, pullulanase, used in the process of this invention, is produced by members of the bacterial species *Aerobacter aerogenes* when suitably incubated under conditions of aerobic culture.

Characteristics by which members of the species *Aerobacter aerogenes* may be distinguished are described by M. W. Yale, R. S. Breed et al., in "Bergey's Manual of Determinative Bacteriology," Seventh edition, p. 341–42, Williams and Wilkins Co., Baltimore, Md., 1967, although it is well recognized by those skilled in the science, that individual strains may be isolated from time to time which do not completely conform to this identical description.

The method of producing the enzyme pullulanase is described by Hans Bender and Kurt Wallenfels in Biochemische Zeitschrift, 334, 79–95 (1961).

The source of the *Aerobacter aerogenes* culture exemplified in the present disclosure was the American Type Culture Collection, 12301 Parklawn Drive, Rockville, Md. The designation of the culture was *Aerobacter aerogenes* ATCC 8724. One method of obtaining the enzyme from the culture is as follows:

A medium containing: 0.8% Difco Bacto-peptone, 0.5% maltose, 0.3% sodium nitrate, 0.05% dibasic potassium phosphonate, 0.05% potassium chloride, 0.001% ferrous sulfate heptahydrate with a pH adjusted to 7.2; is dispensed into 1,000 milliliter Erlenmeyer flasks, 200 milliliters per flask. The flasks are stoppered with cotton plugs and sterilized.

The culture inoculum is obtained by aseptically transferring from an agar slant, cells of a pure culture of the microorganism *Aerofacter aerogenes* ATCC 8724, into a sterilized flask with the above medium. The flask is then placed on a reciprocal shaker in a constant temperature room operated at 20° C. The flask is shaken 24 hours after which time the cuture has prown abundantly and is ready to be used to inoculate flasks of the above defined medium. 10 milliliters are aseptically transferred to each of the enzyme production flasks. These flasks are then placed on a reciprocal shaker in a constant temperature room operated at 29° C. They are shaken for a period of time from 66 to 72 hours. At the end of the fermentation the flasks are removed from the shaker, their contents pooled and the cells therein removed from the culture liquor by centrifugation. The supernatant liquor is then adjusted to pH 6.2 and preserved by the addition of toluene. An aliquot of the supernatant liquor is then assayed for enzyme activity. The amount of pullulanase enzyme produced may vary from about 0.05 to 0.15 unit per milliliter.

A concentrated dried preparation of the pullulanase enzyme may be obtained by the following procedure:

1500 milliliters of chilled (4° C.) acetone is added to 1 liter of chilled (4° C.) cell free culture liquor containing 10 grams of diatomaceous earth. After complete mixing the suspension is vacuum filtered to recover the insolubilized enzyme. Upon completion of filtration, the filter cake is recovered, spread, and allowed to dry overnight at room temperature. Once the filter cake is dried it is assayed for pullulanase enzyme activity. Preparations obtained by this procedure will have an activity from 3 to 10 units per gram, depending on the activity of the culture liquor used and the efficiency of recovery.

The level of pullulanase enzyme activity present in pullulanase preparations may be determined as follows:

An aliquot of enzyme solution is adjusted to pH 5.5, and 1.0 milliliter is added to a digestion mixture composed of 2 milliliters of a 5% pullulan solution and 7 milliliters of a M/50 phosphate buffer, pH 5.5. The reaction is carried out in test tubes placed in a 40° C. water bath and is allowed to proceed for 1 hour. At the end of the digestion period, the reaction is stopped by the addition of hydrochloric acid to lower the pH to 3.0. The reducing sugar content of the digestion mixture is determined, as well as that of the culture liquor and pullulan used, by a modification of the alkaline potassium ferricyanide method described hereinafter and is experessed as microgram equivalents of dextrose. Pullulanase enzyme activity is calculated as follows:

$$A = \frac{T-(C+P)}{180 \times 60} \times D$$

where

A = Pullulanase enzyme activity, units per milliliter or gram of enzyme preparation.
T = Total reducing sugars in digestion mixture in micrograms expressed as dextrose.
C = Residual reducing sugars in culture liquor in micrograms expressed as dextrose.
P = Reducing value of the pullulan polysaccharide used in the digestion mixture in micrograms expressed as dextrose.
D = Dilution factor of enzyme preparation.
180 = Reducing value of 1 micromole of dextrose.
60 = Time (minutes) of reaction.

One unit of pullulanase is defined as the amount of enzyme required to produce 180 micrograms of reducing sugars, calculated as dextrose, per minute from pullulan under the conditions specified above. The polysaccharide, pullulan, which is a polymer of maltotriose units connected to each other by alpha 1–6 linkages, may be obtained from *Pullularia pullulans* ATCC 9348 by use of the procedure of S. Ueda, K. Fujita, K. Komatsu, and Z. Nakashima, Applied Microbiology 11, 211–215 (1963). The modified potassium ferricyanide assay procedure used for determination of reducing agents is assaying enzyme preparations is conducted as follows:

Reagents.—Alkaline ferricyanide: Dissolve 1.170 g. of potassium ferricyanide and 19.5 g. of anhydrous sodium carbonate in water and dilute to 1 liter. Store in amber bottle. Standard dextrose solution, 0.1 mg./ml.: Weigh 1.000 g. of pure anhydrous dextrose and dilute to 100 ml. Using a class A pipette, transfer 10.0 ml. of the solution to a 1-liter flask and dilute to mark.

Procedure.—Standardization: Pipette 0.5, 1.0, 2.0 and 2.5 ml. aliquots of standard dextrose solution, 0.1 mg./ml., into respective 18-cm. test tubes. Then water is added in amounts to bring the total volume of the respective tubes to 2.5 ml. The reagent blank contains 2.5 ml. of water. To each tube is then added 5 ml. of the alkaline ferricyanide solution. The mixture is then heated in a boiling waterbath for exactly 5 minutes, cooled immediately in a tap-waterbath, diluted to 12.5 ml. volume with water and mixed. Using water as reference solution at 0 absorbance, determine the absorbancy of the blank and of each of the standard tubes at 373 m$\mu$ on a Beckman DU spectophotometer, using 1-cm. cuvettes.

Analysis.—An aliquot of enzyme preparation is used which will produce from 1 to 10 mg. reducing sugar per 10 ml. digestion mixture. The sample of the digestion mixture assayed in this method will contain from 50 to 250 micrograms of reducing sugar.

Calculation.—Plot absorbances of standard tubes corrected for blank versus micrograms of dextrose per 12.5 ml. on linear coordinate graph for standardization curve.

The invention may be further understood by reference to the specific examples described in detail below. All percent figures are by weight unless otherwise particularly specified.

In some of the examples, reference is made to the fluidity of acid-modified starches. The fluidity of a starch is defined as the number of milliliters of a standard alkaline starch paste delivered by a special funnel in the time required by the same funnel to deliver 100 milliliters of water. The standard procedure for determining fluidity is described by P. Shildneck and C. E. Smith in Starch: Chemistry and Technology, vol. II, p. 219, R. L. Whistler and E. F. Paschall, Editors, Academic Press, New York and London, 1967.

It is understood, of course, that the following examples are merely illustrative and that the invention is not to be limited thereto.

Example 1.—This example illustrates the use of *Pseudomonas stutzeri* amylase in the conversion of acid-modified waxy milo starch of 80 fluidity to conversion products having high maltotetraose contents.

10% and 20% solutions of acid-modified starch were prepared by dissolving the acid-modified starch in boiling water. The resulting solutions were incubated with *Pseudomonas stutzeri* amylase at 50° C. at a pH of 6.5 for 20 hours and for 48 hours, respectively. At the end of this time, the starch hydrolyzates had the compositions shown in Table I.

TABLE I

| *Pseudomonas stutzeri* amylase (u/100 g.) | Weight percent, starch | Saccharide distribution, weight percent, D.B. | | | | |
|---|---|---|---|---|---|---|
| | | D.E. | Glucose | Maltose | Malto-triose | Malto-tet-raose | Higher saccha-rides |
| 1,000 | 10 | 26 | 1.1 | 2.3 | 5 | 55 | 36.6 |
| 200 | 20 | 21.1 | 1.1 | 1.9 | 4.4 | 56.2 | 36.4 |

Example 2.—This example describes the use of *Pseudomonas stutzeri* amylase to convert enzyme-thinned waxy milo starch at high solids concentrations to a high maltotetraose hydrolyzate. The hydrolyzate produced in accordance with this example is then converted to a high maltotetraose syrup by removing part of the water by evaporation or other equivalent means. The high maltotetraose syrup produced in this manner may then be utilized in candy and ice cream formulations. Alternatively, it may be spray dried to form a syrup solid which may be utilized in these and other applications.

A 30% solution of waxy milo starch was thinned with *Bacillus subtilis* alpha-amylase to 5 D.E. by conventional procedures. This thinned starch was incubated with *Pseduomonas stutzeri* amylase (200 units/100 grams) at 503 C. and pH of 6.5 for 48 hours. The resulting hydrolyzate exhibited a D.E. of 22.7 and had the composition (weight percent D.B.) shown below.

TABLE II

| | Percent |
|---|---|
| Glucose | 1.3 |
| Maltose | 4.3 |
| Maltotriose | 7.7 |
| Maltotetraose | 50.0 |
| Higher saccharides | 36.7 |

Example 3.—This example describes the use of *Pseudomonas stutzeri* amylase to convert a partial acid hydrolyzate of starch at high solids content to a high maltotetraose hydrolyzate.

A 35% solution of corn starch, which had been partially hydrolyzed by acid to 16 D.E. by conventional procedures, was incubated at 50° C and a pH of 6.5, with *Pseudomonas stutzeri* amylase (200 units/100 grams). The resulting hydrolyzate exhibited a D.E. of 29 and had the following composition: (weight percent D.B.)

TABLE III

| | Percent |
|---|---|
| Glucose | 4.6 |
| Maltose | 7.0 |
| Maltotriose | 8.6 |
| Maltotetraose | 50.2 |
| Higher saccharides | 29.6 |

Example 4.—The starches of Examples 1, 2, and 3 were converted simultaneously with *Pseudomonas stutzeri* amylase and pullulanase debranching enzyme from *Aerobacter aerogenes* at 50° C. and pH 6.5. The resulting high maltotetraose hydrolyzates had the following compositions:

TABLE IV

| Starch substrate | Weight percent, starch | Pullulanase (u/100 g.) | Saccharide distribution, weight percent, D.B. | | | | |
|---|---|---|---|---|---|---|---|
| | | | D.E. | Glucose | Maltose | Malto-triose | Malto-tetraose | Higher Sacchar-ides |
| Waxy Milo, 80 fluidity | 10 | 300 | 30 | 1.6 | 4.0 | 7.2 | 67.0 | 20.2 |
| Do | 20 | 200 | 26.8 | 1.0 | 5.7 | 7.7 | 61.0 | 24.6 |
| Waxy milo, enzyme-thinned to 5 D.E. | 30 | 200 | 29.4 | 2.5 | 7.8 | 11.5 | 55.7 | 24.5 |
| Corn, acid-thinned to 16 D.E. | 35 | 200 | 31.6 | 4.5 | 8.1 | 11.6 | 50.0 | 25.8 |

This example illustrates the increased maltotetraose yields attainable when pullulanase enzyme as well as *Pseudomonas stutzeri* amylase is used during incubation of acid-modified starch, and of partial acid and enzyme hydrolyzate of starch. It also illustrates that solutions containing relatively high levels of solids may be successfully treated by this procedure.

Example 5.—*Pseudomonas stutzeri* amylase was employed as described in the previous examples to convert 20% solutions of enzyme-thinned corn starch to high maltotetraose hydrolyzates. Conversions were conducted at 55° C. and a pH of 7. The enzyme dosages were in the range from 200 to 3,200 units per 100 grams of starch. Incubation was stopped after 48 hours and the samples removed and analyzed for D.E. and saccharide distribution. The results are shown below.

TABLE V

| *Pseudomonas stutzeri* amylase (u/100 g.) | Saccharide distribution, weight percent, D.B. | | | | |
|---|---|---|---|---|---|
| | D.E. | Glucose | Maltose | Malto-triose | Malto-tetraose | Higher saccha-rides |
| 3,200 | 27 | 2 | 5.2 | 8.8 | 55.0 | 29 |
| 1,600 | 26 | 1.4 | 4.5 | 7.8 | 57.0 | 29.3 |
| 800 | 25 | 1.0 | 3.9 | 7.4 | 56.7 | 31.0 |
| 400 | 26 | 1.4 | 3.9 | 6.3 | 57.0 | 31.4 |
| 200 | 25 | 1.2 | 3.9 | 6.6 | 56.0 | 33.3 |

The data indicates that no more than about 200 units of *Pseudomonas stutzeri* amylase per 100 grams of starch is a sufficient dosage for maximum maltotetraose production.

Example VI.—*Pseudomonas stutzeri* was employed as described in the previous examples to convert 40% solutions of enzyme thinned waxy milo starch to high maltotetraose hydrolyzates. Conversions were conducted at 55° C. and at a pH of 6.5. The enzyme dosages employed fell within the range from 10.5 to 210 units per 100 grams of starch. The incubation was stopped after 48 hours and the samples were removed and analyzed for D.E. and saccharide distribution. The results are shown below:

TABLE VI

| Pseudomonas stutzeri amylase (u/100 g.) | D.E. | Saccharide distribution, weight percent, D.B. | | | | |
|---|---|---|---|---|---|---|
| | | Glucose | Maltose | Malto-triose | Malto-tetraose | Higher saccharides |
| 10.5 | 13.0 | 0.3 | 2.0 | 4.0 | 26.8 | 66.9 |
| 21.0 | 14.4 | 1.0 | 2.4 | 4.0 | 29.6 | 64.0 |
| 52.5 | 18.9 | 1.0 | 2.9 | 4.4 | 40.2 | 51.5 |
| 105 | 20.5 | 1.5 | 2.9 | 5.2 | 48.3 | 42.1 |
| 210 | 22.2 | 1.4 | 3.7 | 6.5 | 49.0 | 39.4 |

The data indicates that, although higher enzyme dosages may be required for maximum maltotraose production, hydrolyzates containing substantial amounts of maltotraose may be produced utilizing no more than about 10 units of Pseudomonas stutzeri amylase per 100 grams of starch.

Example VII.—*Pseudomonas stutzeri* amylase was employed in the conversion of 40% to 55% solutions of enzyme thinned waxy milo starch to high maltotetraose hydrolyzates. Conversions were conducted at 55° C. and at a pH of 7.0. The enzyme dosage employed was 200 units per 100 gm. of starch solids. Incubation was stopped after 48 hours and the samples removed and analyzed for D.E. and saccharide distribution. The results are shown below:

TABLE VII

| Substrate concentration, percent D.S. | D.E. | Saccharide distribution, weight percent, DB | | | | |
|---|---|---|---|---|---|---|
| | | Glucose | Maltose | Malto-triose | Malto-tetraose | Higher saccharide |
| 42.0 | 25.2 | 2.0 | 7.1 | 12.5 | 42.5 | 35.9 |
| 51.9 | 24.3 | 1.8 | 6.8 | 11.5 | 42.0 | 36.8 |
| 54.3 | 24.1 | 2.1 | 6.6 | 12.0 | 42.0 | 37.3 |

The data show that high maltotetraose hydrolyzates can be produced by the action of *Pseudomonas stutzeri* amylase at substrate concentrations up to at least about 55% solids.

Example VIII.—*Pseudomonas stutzeri* amylase, both with and without the aid of pullulanase, was employed in conversion of 5% to 35% by weight solutions of enzyme thinned waxy milo starch to high maltotetraose hydrolyzates. Conversions were conducted at 55° C. and at a pH of 6.0 to 6.5. The *Pseudomonas stutzeri* amylase dosage employed was 500 units per 100 grams of starch. The pulluanase dosage, when pullulanase was used, was 200 units per 100 grams of starch. Incubation was stopped after 24 hours and the samples were removed and analyzed for D.E. and saccharide distribution. The data is tabulated below.

TABLE VIII

| Weight, percent starch | Pullulanase | Hydrolyzate, final D.E. | Saccharide distribution, weight percent, DB | | | | |
|---|---|---|---|---|---|---|---|
| | | | Glucose | Maltose | Malto-triose | Malto-tetraose | Saccharides |
| 5 | Yes | 33.0 | 1.9 | 6.8 | 10.3 | 67.5 | 13.5 |
| | No | 24.5 | 1.8 | 4.6 | 8.6 | 49.8 | 35.2 |
| 10 | Yes | 33.6 | 2.7 | 7.8 | 11.7 | 63.4 | 14.4 |
| | No | 26.2 | 2.0 | 5.0 | 10.0 | 48.0 | 35.0 |
| 20 | Yes | 31.0 | 2.3 | 7.0 | 11.5 | 57.3 | 21.9 |
| | No | 27.2 | 2.7 | 5.4 | 10.4 | 45.8 | 35.7 |
| 30 | Yes | 28.4 | 3.3 | 7.1 | 10.1 | 53.5 | 26.0 |
| | No | 25.8 | 2.4 | 3.0 | 10.0 | 45.6 | 37.0 |
| 35 | Yes | 28.7 | 3.0 | 7.2 | 10.2 | 51.2 | 28.4 |
| | No | 23.8 | 2.7 | 5.1 | 10.0 | 45.8 | 36.4 |

The results indicate that pullulanase, when used in combination with *Pseudomonas stutzeri* amylase, is effective in increasing maltotetraose production and that it is most effective at low substrate concentrations.

It is apparent that a relatively high maltotetraose content starch conversion product can be obtained by forming a high solids content solution of an acid-modified starch or of a partial acid or enzyme hydrolyzate of starch, or mixture thereof, and then incubating the solution with *Pseudomonas stutzeri* amylase. It is also apparent that the yield of maltotetraose in the high maltotetraose content starch conversion product, and in the high maltotetraose syrup and syrup solid obtained therefrom, can be increased if pullulanase, in addition to *Pseudomonas stutzeri* amylase, is used during the incubation procedure.

A very real advantage is attained over prior art procedures in that much more maltotetraose can be formed per unit volume of solution, thus reducing costs for heating, storing, and concentrating solutions.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

I claim:

1. A process for producing a high maltotetraose product which comprises: incubating a solution of solubilized starch selected from the group consisting of acid-modified starches, partial hydrolyzates of starch obtained by acid and/or enzyme hydrolysis, and mixtures thereof; with an amylase which is produced by the microorganism *Pseudomonas stutzeri;* and recovering a product that is high in maltotetraose content.

2. The process of claim 1 wherein the starch solution is also subjected to the action of a starch debranching enzyme.

3. The process of claim 1 wherein said amylase is produced by *Pseudomonas stutzeri* strain NRRL B3389.

4. The process of claim 2 wherein said amylase is produced by *Pseudomonas stutzeri* strain NRRL B3389.

5. The process of claim 2 wherein said starch debranching enzyme is pullulanase.

6. The process of claim 1 wherein the weight percent of the starch in said starch solution is above 5%.

7. The process of claim 2 wherein the weight percent of starch in said starch solution is above 5%.

8. The process of claim 1 wherein the weight percent of starch in said starch solution falls in the range from about 10% to about 55%.

9. The process of claim 2 wherein the weight percent of starch in said starch solution falls in the range from about 10% to about 55%.

10. The process of claim 1 wherein said incubation is carried out at a temperature which falls in the range from about 40° C. to about 65° C.

11. The process of claim 2 wherein said incubation is carried out at a temperature which falls in the range from about 40° C. to about 65° C.

12. The process of claim 1 wherein said incubation is carried out at a temperature which falls in the range of from about 50° C. to about 60° C.

13. The process of claim 2 wherein said incubation is carried out at a temperature which falls in the range from about 50° C. to about 60° C.

14. The process of claim 1 wherein said incubation is carried out at a pH that falls in the range from about 6 to about 9.

15. The process of claim 2 wherein said incubation is carried out at a pH that falls in the range from about 6 to about 9.

16. The process of claim 1 wherein said incubation is carried out at a pH that falls in the range from about 6.5 to about 7.5.

17. The process of claim 2 wherein said incubation is carried out at a pH that falls in the range from about 6.5 to about 7.5.

18. The process of claim 1 wherein said starch is an acid-modified waxy milo starch.

19. The process of claim 2 wherein said starch is acid-modified waxy milo starch.

20. The process of claim 1 wherein said starch is alpha-amylase-thinned waxy milo starch.

21. The process of claim 2 wherein said starch is alpha-amylase-thinned waxy milo starch.

22. The process of claim 1 wherein said starch is a partial hydrolyzate of corn starch made by acid hydrolyzing said corn starch.

23. The process of claim 2 wherein said starch is a partial hydrolyzate of corn starch made by acid hydrolyzing said corn starch.

24. The process of claim 1 wherein said starch is alpha-amylase-thinned corn starch.

25. The process of claim 2 wherein said starch is alpha-amylase-thinned corn starch.

26. The maltotetraose product produced by the process of claim 1, containing at least about 40% by weight, on a dry basis, of maltotetraose.

27. The maltotetraose product produced by the process of claim 2, containing at least about 40% by weight, on a dry basis, of maltotetraose.

28. The product produced in accordance with claim 26, in the form of dried solids.

29. The product produced in accordance with claim 27, in the form of dried solids.

30. The product produced in accordance with claim 26, in the form of a syrup.

31. The product produced in accordance with claim 27, in the form of a syrup.

References Cited

UNITED STATES PATENTS 3,535,123  10/1970  Heady _____ 195—31

OTHER REFERENCES

Clark et al.: "Isolation of Maltotriose and Maltotetraose," Nature, vol. 200, pp. 30–2, 1963.

Harada et al.: "Formation of Isoamylase by Pseudomonas," Appl. Microbiol., vol. 16, pp. 1439–44, 1968.

Lee et al.: Arch. Biochem. and Biophys., vol. 116, pp. 162–7, 1966.

Pazur, J. H.: J. Biol. Chem., pp. 75–80, November 1953.

Greenwood et al.: "Studies on Starch-Degrading Enzymes, Part VIII," Die Stärke, pp. 139–150, May 1968.

A. LOUIS MONACELL, Primary Examiner

G. M. NATH, Assistant Examiner